United States Patent
Shin

(10) Patent No.: US 11,814,007 B1
(45) Date of Patent: Nov. 14, 2023

(54) AIRBAG DEVICE AND METHOD FOR MANUFACTURING AIRBAG CUSHION

(71) Applicant: HYUNDAI MOBIS CO., LTD., Seoul (KR)

(72) Inventor: Seok Min Shin, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/062,550

(22) Filed: Dec. 6, 2022

(30) Foreign Application Priority Data

Sep. 14, 2022 (KR) .......... 10-2022-0115923

(51) Int. Cl.
*B60R 21/239* (2006.01)
*B60R 21/207* (2006.01)
*B60R 21/00* (2006.01)

(52) U.S. Cl.
CPC .......... *B60R 21/239* (2013.01); *B60R 21/207* (2013.01); *B60R 2021/0048* (2013.01); *B60R 2021/2074* (2013.01); *B60R 2021/2395* (2013.01)

(58) Field of Classification Search
CPC .............. B60R 21/239; B60R 21/207; B60R 2021/2395
See application file for complete search history.

(56) References Cited

U.S. PATENT DOCUMENTS

| | | | | |
|---|---|---|---|---|
| 5,280,953 A | * | 1/1994 | Wolanin | B60R 21/239 280/739 |
| 8,276,939 B2 | | 10/2012 | Kuehne | |
| 9,415,743 B2 | * | 8/2016 | Kim | B60R 21/276 |
| 10,814,826 B2 | * | 10/2020 | Baba | B60R 21/239 |
| 11,254,273 B2 | * | 2/2022 | Riffe | B60R 21/239 |

FOREIGN PATENT DOCUMENTS

| | | |
|---|---|---|
| KR | 10-1622094 | 5/2016 |
| KR | 10-1708203 | 2/2017 |

OTHER PUBLICATIONS

English Language Abstract of KR 10-1708203 published Feb. 20, 2017.
English Language Abstract of KR 10-1622094 published May 31, 2016.

* cited by examiner

*Primary Examiner* — Faye M Fleming
(74) *Attorney, Agent, or Firm* — DLA PIPER LLP (US)

(57) ABSTRACT

An airbag device configured to improving the opening and closing operability of a vent hole to reduce injuries to a passenger. The airbag device includes a cushion panel of an airbag cushion, the cushion panel having a hole, a guide panel overlapped with the cushion panel, and having a hole matching with the hole of the cushion panel, a bellows vent having a hollow vent hole therein, and connected to the hole of the cushion panel and the hole of the guide panel in a folded state while being located therebetween, and a tether connected to the bellows vent, and configured to close the vent hole by the bellows vent unfolded between the cushion panel and the guide panel as a tension pulling the bellows vent in a deployment direction of the airbag cushion due to an expansion pressure of the airbag cushion is generated.

19 Claims, 13 Drawing Sheets

A-A section

B-B section

AIRBAG DEVICE AND METHOD FOR MANUFACTURING AIRBAG CUSHION

CROSS REFERENCE TO RELATED APPLICATION

The present application claims priority to Korean Patent Application No. 10-2022-0115923, filed Sep. 14, 2022, the entire contents of which is incorporated herein for all purposes by this reference.

BACKGROUND OF THE INVENTION

Field of the Invention

The present invention relates generally to an airbag device configured to improve the opening and closing operability of a vent hole to reduce injuries to a passenger.

Description of the Related Art

Because considerable pressure is required to deploy a passenger airbag (PAB), the deployment pressure may cause injuries to a passenger.

In order to reduce injuries to the passenger, an evaluation of the low risk deployment (LRD) law has been carried out.

For example, an LRD vent that lowers the cushion deployment pressure in the early stage of airbag deployment and maintains the cushion internal pressure in the latter part is used.

Furthermore, in order to reduce injuries to the passenger, the airbag has adopted a system lowering the pressure of the airbag by separately adding an active vent adjusting the pressure when the passenger is restrained by the PAB.

However, in the active vent, in order to secure the initial PAB deployment pressure, the active vent should be maintained in the closed state (holding structure using strap and pin) and the active vent should be opened when desired. In addition to a structure releasing the pin, a design structure in which a signal is transmitted from an airbag control unit (ACU), etc. may be applied.

Therefore, compared to the existing PAB housing, a layout of the system with the active vent is degraded. Furthermore, since different signals should be transmitted depending on a location of a dummy, it is necessary to continuously check which point is the optimal time in which the active vent is opened through evaluation.

The foregoing is intended merely to aid in the understanding of the background of the present invention, and is not intended to mean that the present invention falls within the purview of the related art that is already known to those skilled in the art.

SUMMARY OF THE INVENTION

The present invention is intended to provide an airbag device configured to improve the opening and closing operability of a vent hole to reduce injuries to a passenger.

In order to achieve the above objective, an airbag device of the present invention includes: a cushion panel of an airbag cushion, the cushion panel having a hole; a guide panel overlapped with the cushion panel, and having a hole matching with the hole of the cushion panel; a bellows vent having a hollow vent hole therein, and connected to the hole of the cushion panel and the hole of the guide panel in a folded state while being located therebetween; and a tether connected to the bellows vent, and configured to close the vent hole by the bellows vent unfolded between the cushion panel and the guide panel as a tension pulling the bellows vent in a deployment direction of the airbag cushion due to an expansion pressure of the airbag cushion may be generated.

The bellows vent may be configured to be folded with the vent hole thereof matching with the hole of the cushion panel and the hole of the guide panel.

The bellows vent may include a plurality of bellows panels and holes may be respectively formed in the bellows panels, and the holes may match and be overlapped with each other, and the bellows panels may be sewn such that inner-diameter edges and outer-diameter edges of the bellows panels may be alternately sewn in the order in which the bellows panels are overlapped.

Among the sewn edges of the bellows panels, a portion through which the tether passes may be in a non-sewn state.

The guide panel may be overlapped with an inner portion of the cushion panel and fixed; and the tether may be connected to the bellows vent between the cushion panel and the guide panel.

An edge of the guide panel may be sewn with the cushion panel, and among the edge of the guide panel, a portion through which the tether passes may be in a non-sewn state.

As the bellows vent is tightened by the tension of the tether, the bellows vent may be pulled in a pulling direction of the tether.

An opening may be formed open on a lateral surface of the bellows vent in a pulling direction of the tether.

Slits through which the tether passes may be formed in the bellows vent at opposite sides of the opening.

The tether may pass radially through the hole of the bellows vent while wrapping around the bellows vent, and the tether may be connected thereto in a shape in which the tether that has penetrated through the bellows vent may pass through the slits and may be taken out through the opening.

The tether may be provided in a deployment direction of the airbag cushion from the bellows vent and the tension may be provided by a deployment force of the airbag cushion.

The tether may be fixed to a portion of the cushion panel, to which a passenger is cushioned.

The vent hole may be an LRD vent hole configured to realize an LRD function.

A passenger seat airbag device may include: a cushion panel of a passenger airbag cushion, the cushion panel having a hole; a guide panel overlapped with the cushion panel, and having a hole matching with the hole of the cushion panel; a bellows vent having a hollow vent hole therein, and connected to the hole of the cushion panel and the hole of the guide panel in a folded state while being located therebetween; and a tether connected to the bellows vent, and configured to close the vent hole by the bellows vent unfolded between the cushion panel and the guide panel as a tension pulling the bellows vent in a deployment direction of the airbag cushion due to an expansion pressure of the airbag cushion may be generated.

A method of manufacturing an airbag cushion may include: assembling of a bellows vent, wherein holes formed in a plurality of bellows panels are overlapped to match with each other and the bellows vent having a hollow vent hole therein is assembled; connecting of the bellows vent, wherein a first end of the vent hole may match with a hole of a cushion panel to fix the bellows vent to the cushion panel, and a second end of the vent hole may match with a hole of a guide panel to fix the bellows vent to the guide panel; connecting of a tether, wherein a first end of the tether may be connected to the bellows vent and a second end of the tether may be fixed to a portion of the cushion panel, to which a passenger is cushioned; and fixing of the guide panel, wherein the guide panel may be fixed to the cushion panel.

In the assembling of the bellows vent, the bellows vent may be sewn such that inner-diameter edges and outer-diameter edges of the bellows panels may be alternately sewn in the order in which the bellows panels are overlapped.

The guide panel may be overlapped with an inner portion of the cushion panel and fixed; and the tether may be connected to the bellows vent between the cushion panel and the guide panel.

In the fixing of the guide panel, an edge of the guide panel may be sewn with the cushion panel, and in the edge of the guide panel, a portion through which the tether passes may be in a non-sewn state.

An opening may be formed on a lateral surface of the bellows vent in a pulling direction of the tether, and slits through which the tether passes may be formed in the bellows vent at opposite sides of the opening; and in the fixing of the tether, the tether may pass radially through the bellows vent while wrapping around the bellows vent, and the tether may be connected thereto in a shape in which the tether that has penetrated through the bellows vent may pass through the slits and may be taken out through the opening.

With the technical solution described above, the airbag device of the present invention is configured such that, in the beginning of deployment of the airbag, the bellows vent is unfolded by a tension of the tether and the vent hole is maintained in the closed state, and in the process in which the passenger is cushioned by the airbag cushion and is restrained, the bellows vent is recovered and the vent hole is opened.

Therefore, the vent hole is opened and closed without a device such as an active vent or a device additionally applying an operation signal, so that the opening and closing operability of the vent hole is improved and injuries to the passenger can be efficiently reduced.

DETAILED DESCRIPTION OF THE INVENTION

Figure 1:
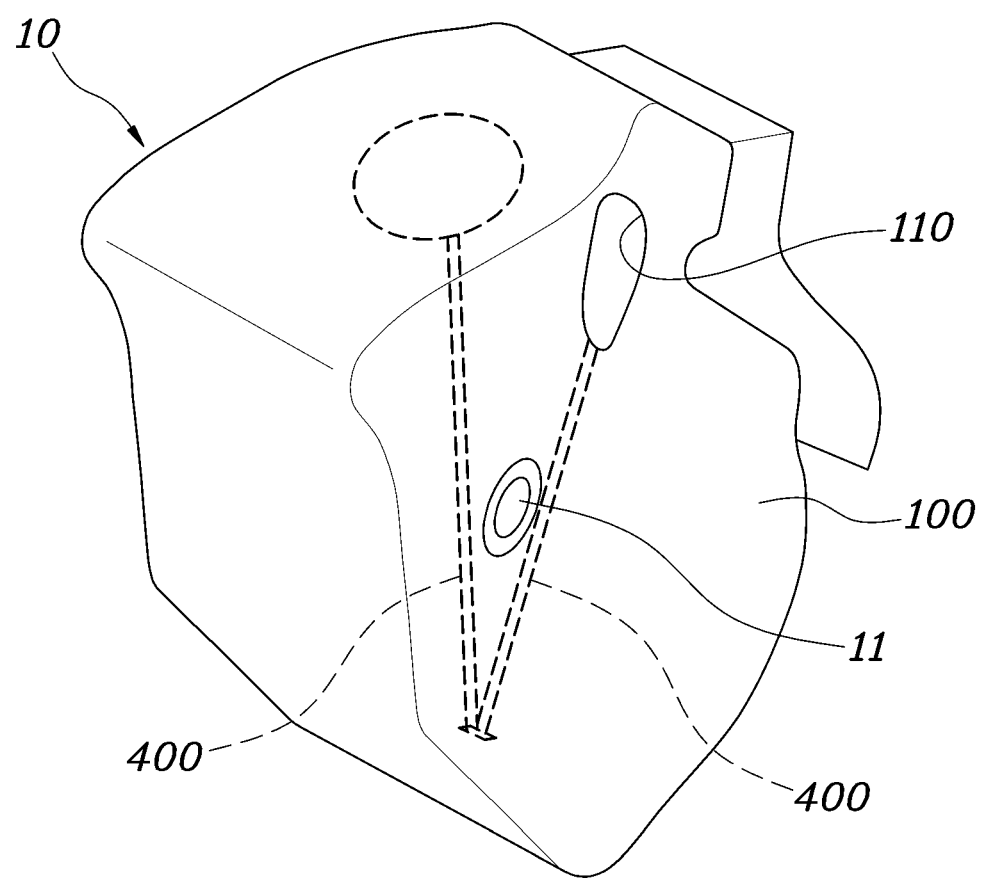
FIG. 1 is a view showing a deployed state of an airbag cushion according to the present invention.

Hereinbelow, a preferred embodiment described in the specification will be described in detail with reference to accompanying drawings, and regardless of the reference numerals, the same reference numerals will refer to the same or like parts, and redundant descriptions thereof will be omitted.

The suffixes "module and "part" for the components used in the following description are given or mixed in consideration of only the ease of writing the specification, and do not have distinct meanings or roles by themselves.

In the following description, if it is decided that the detailed description of known function or configuration related to the invention makes the subject matter of the invention unclear, the detailed description is omitted. Furthermore, the accompanying drawings are only for understanding of the preferred embodiments of the present invention, and the technical ideas disclosed in the specification are not limited by the accompanying drawings, and those skilled in the art will appreciate that various modifications, additions and substitutions are possible, without departing from the scope and spirit of the invention as disclosed in the accompanying claims.

It will be understood that, although the terms first and/or second, etc. may be used herein to describe various elements, these elements should not be limited by these terms. These terms are only used to distinguish one element, from another element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Figure 2:
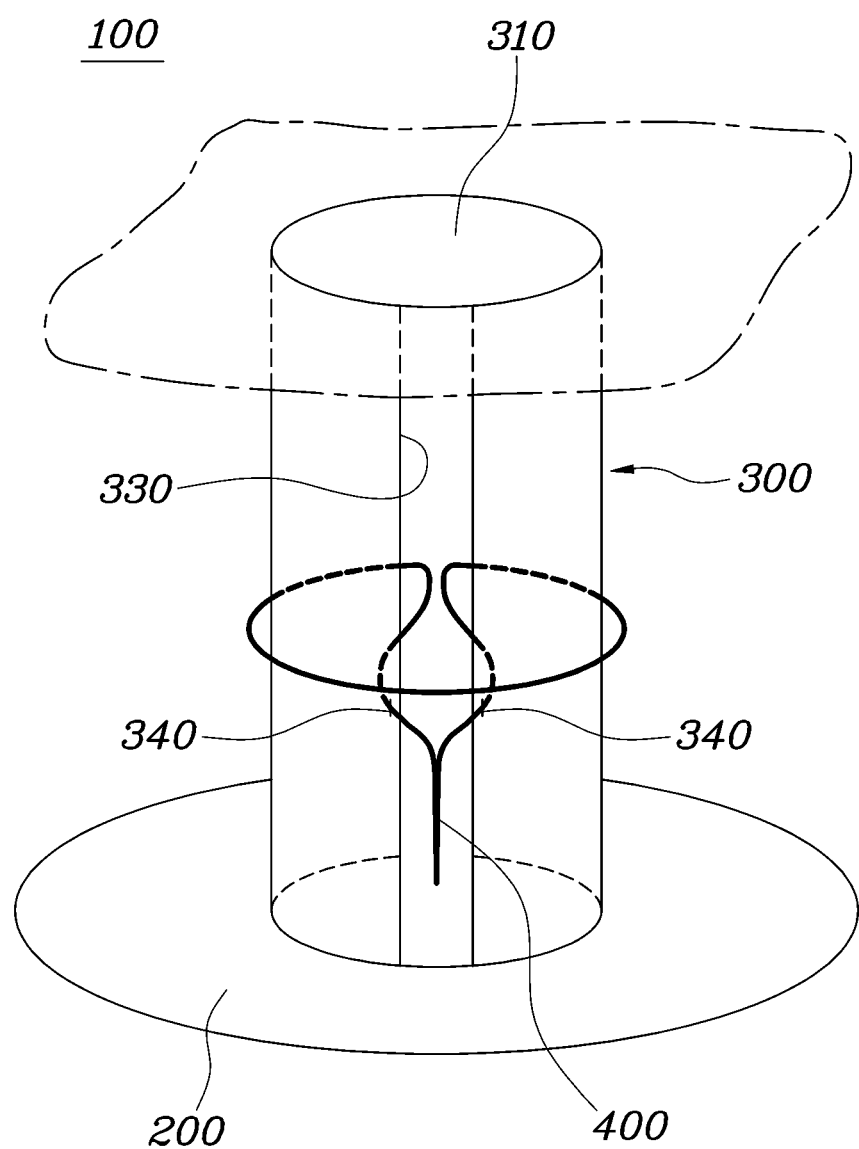
FIG. 2 is a view showing an exterior shape of a bellows vent assembled to the airbag cushion according to the present invention.
Figure 3:
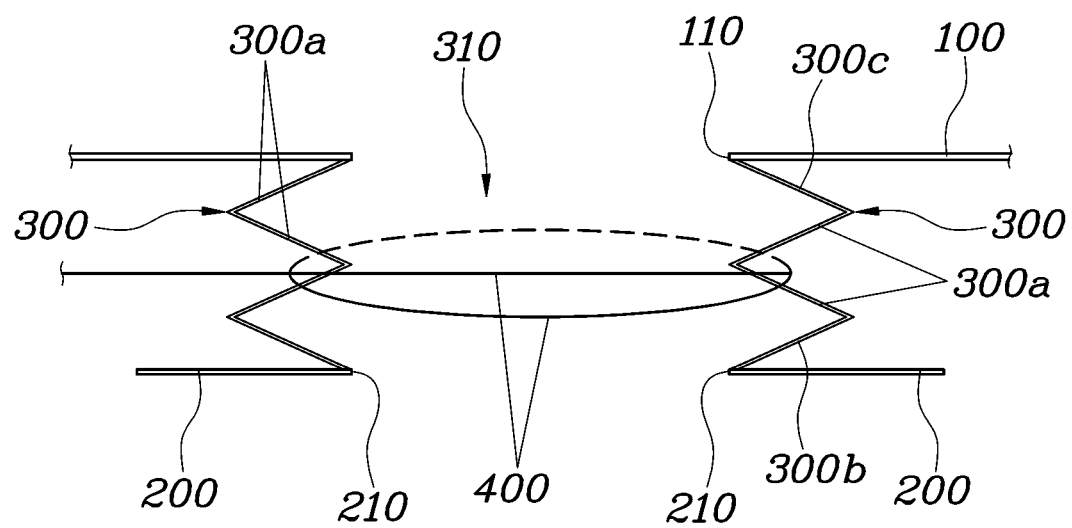
FIG. 3 is a view showing a shape of the bellows vent folded to the airbag cushion according to the present invention.
Figure 4:
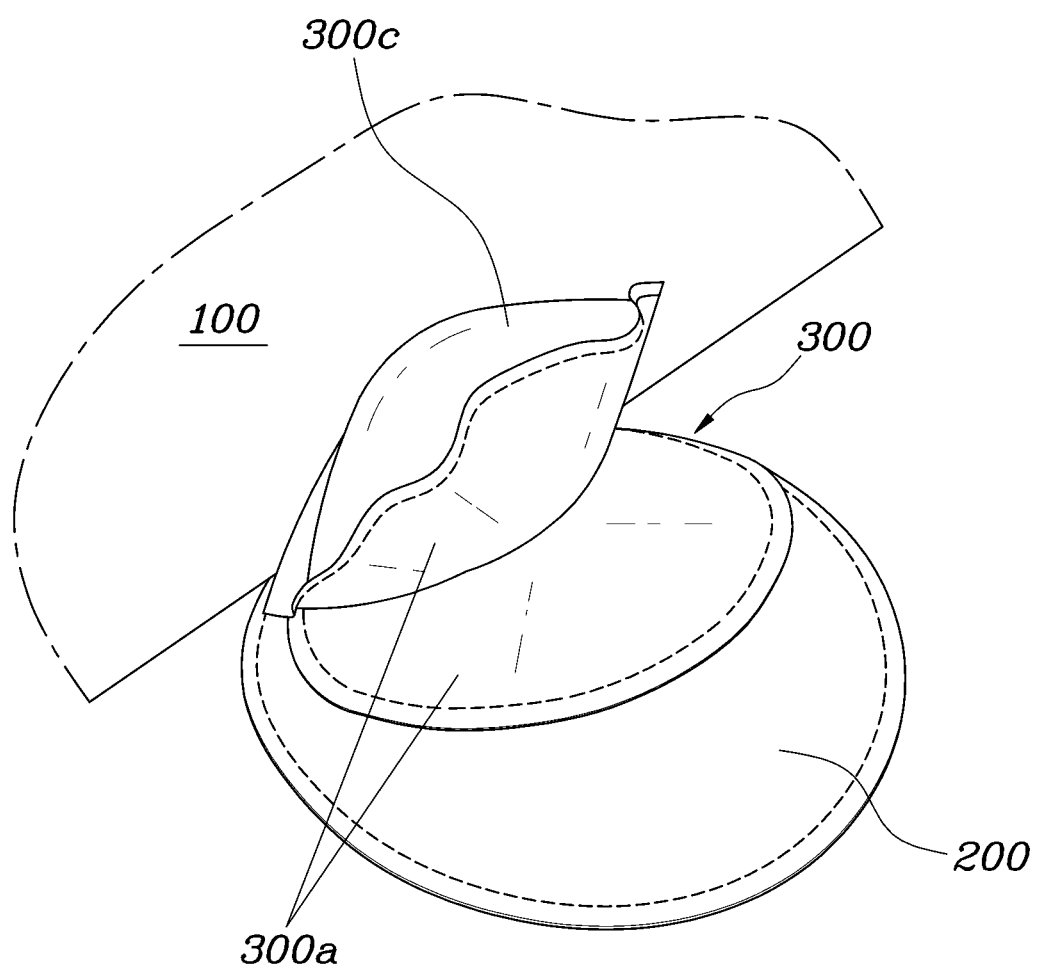
FIG. 4 is a view showing a shape of the bellows vent shown when a guide panel according to the present invention is pulled aside.

FIG. 1 is a view showing a deployed state of an airbag cushion 10 according to the present invention. FIG. 2 is a view showing an exterior shape of a bellows vent assembled to the airbag cushion according to the present invention. FIG. 3 is a view showing a shape of the bellows vent 300 folded to the airbag cushion 10 according to the present invention. FIG. 4 is a view showing a shape of the bellows vent 300 shown when a guide panel 200 according to the present invention is pulled aside.

Referring to the drawings, an airbag device of the present invention includes: a cushion panel 100 of the airbag cushion 10, the cushion panel 100 having a hole 110; the guide panel 200 overlapped with the cushion panel 100, having a hole 210 matching with the hole 110 of the cushion panel 100; the bellows vent 300 having a hollow vent hole 310 therein, and connected to the hole 110 of the cushion panel 100 and the hole 210 of the guide panel 200 in a folded state while being located therebetween; and a tether 400 connected to the bellows vent 300, and configured to close the vent hole 310 by the bellows vent 300 unfolded between the cushion panel 100 and the guide panel 200 as a tension pulling the bellows vent 300 in a deployment direction of the airbag cushion 10 due to an expansion pressure of the airbag cushion 10 is generated.

For example, the airbag cushion 10 may be an airbag cushion 10 installed at a passenger airbag device, and main vent holes 11 are respectively formed on opposite lateral surfaces of the airbag cushion 10, and in a time a passenger is cushioned by the airbag cushion, gas in the airbag cushion 10 is discharged to the outside space through the main vent holes 11.

In addition, the bellows vent 300 is formed at each of opposite lateral portions of the airbag cushion 10 together with the main vent holes 11 to realize an LRD function, and the bellows vent 300 is formed on each of front or rear portion of both of the main vent holes 11, and in time the passenger is cushioned to the airbag cushion, the gas inside the airbag cushion 10 is discharged to the outside space through the vent hole 310 of the bellows vent 300 to protect the passenger.

Therefore, the cushion panel 100 serves as a panel providing a lateral portion of the airbag cushion 10, and the guide panel 200 is additionally provided and may be overlapped to an inner portion of the cushion panel 100.

The hole 110 of the cushion panel 100 and the hole 210 of the guide panel 200 are shaped into circular holes corresponding to each other. The vent hole 310 of the bellows vent 300 is also shaped into a circular shape corresponding to the holes 110 and 210 of the cushion panel 100 and the guide panel 200.

Specifically, the bellows vent 300 is located in the space between the cushion panel 100 and the guide panel 200 in a folded state.

In addition, one end of the tether 400 is fixed to the bellows vent 300, and another end of the tether 400 is fixed to an inner surface of the cushion panel 100, so that the tether 400 has a structure in which a tension is applied to the tether 400 due to an expansion force of the airbag cushion 10.

In other words, when the airbag cushion 10 is deployed, as the tether 400 is pulled by the expansion force of the airbag cushion 10 deployed, the bellows vent 300 is pulled in the deployed direction of the airbag cushion 10.

Therefore, in the beginning of deployment of the airbag cushion 10, the vent hole 310 of the bellows vent 300 is closed by the bellows vent 300, so that the airbag cushion 10 expands and is deployed rapidly.

In addition, when the passenger is cushioned on the airbag cushion 10, the weight of the passenger is applied to the tether 400 to reduce the tension of the tether 400, and thus the vent hole 310 of the bellows vent 300 is recovered to an opened previous shape. Therefore, the holes 110 and 210 of the cushion panel 100 and the guide panel 200 and the vent hole 310 of the bellows vent 300 match with each other, so that the vent hole 310 is opened and the passenger is safely restrained.

As described above, at the extremely beginning when the airbag cushion 10 is deployed, the airbag cushion of the present invention starts expansion thereof in a state of the vent hole 310 is opened, but in a process in which the airbag cushion 10 is fully deployed, the vent hole 310 is maintained in a closed state as the bellows vent 300 is unfolded.

In addition, in a process in which the passenger is cushioned on the airbag cushion 10 and restrained, the vent hole 310 is opened.

Therefore, without a device such as an active vent or a device additionally applying an operating signal, the vent hole 310 is opened and closed, and the opening and closing operability of the vent hole 310 is improved, so that injuries to the passenger can be efficiently reduced.

In addition, as shown in FIG. 3, according to the present invention, the bellows vent 300 may be folded with the vent hole 310 thereof matching with the hole 110 of the cushion panel 100 and the hole 210 of the guide panel 200.

For example, when the bellows vent 300 is shaped into a cylinder, it is difficult to fold the bellows vent 300 by compressing the bellows vent 300 in a longitudinal direction, and even when the bellows vent 300 is difficultly folded, it is difficult to maintain the bellows vent 300 in an opened state.

Accordingly, in the present invention, as the bellows vent 300 is shaped into a bellows tube, when the bellows vent 300 is compressed in the longitudinal direction, the bellows vent 300 is formally folded in response to the shape of the bellows tube. Furthermore, before an external force of a predetermined level or more is applied, it is possible to maintain the vent hole 310 located at the center portion of the bellows vent 300 in the opened state.

Specifically, in the present invention, the bellows vent 300 is shaped into the bellows tube so as to be folded with the vent hole 310 of the bellows vent 300 in the opened state, and multiple layers of bellows panels 300a are sewn to form the bellows vent 300 so as to completely realize the bellows tube shape.

In detail, as shown in FIGS. 7A to 7F, the bellows vent 300 includes the plurality of bellows panels 300a, and holes 310a are respectively formed in the bellows panels 300a and the bellows panels 300a are overlapped with each other with the holes 310a matching with each other, and inner-diameter edges and outer-diameter edges of the bellows panels are alternately sewn in the order in which the bellows panels 300a are overlapped.

In other words, the plurality of plate-shaped bellows panels 300a is provided, and is overlapped with each other with the holes 310a of the bellows panels 300a matching with each other. Here, the inner-diameter edges and the outer-diameter edges of the bellows panels 300a are alternately sewn once in the order in which the bellows panels 300a are overlapped, so that the bellows vent 300 may be manufactured into the bellows tube shape.

However, among the sewn edges of between the bellows panels 300a, a portion through which the tether 400 passes may be configured not to be sewn.

For example, the tether 400 connected to the bellows vent 300 penetrates radially through the bellows vent 300, and to this end, a slot 320 of a hole shape is formed in some area of the sewn inner-diameter edges of the bellows panels 300a.

Therefore, as the tether 400 passes through the slot 320, movement of the tether 400 becomes smooth.

For example, the structure of assembling the bellows vent 300 by using the bellows panels 300a will be described below again.

In addition, as shown in FIG. 3, according to the present invention, the guide panel 200 is fixed while being overlapped with an inner portion of the cushion panel 100; and the tether 400 may be connected to the bellows vent 300 between the cushion panel 100 and the guide panel 200.

In other words, as the bellows vent 300 is folded into the bellows tube in the space between the cushion panel 100 and the guide panel 200, when the tether 400 is pulled, the bellows vent 300 is pulled in the center direction of the vent hole 310 on a plane space between the cushion panel 100 and the guide panel 200, so that the vent hole 310 is closed by the bellows vent 300.

Figure 7A:
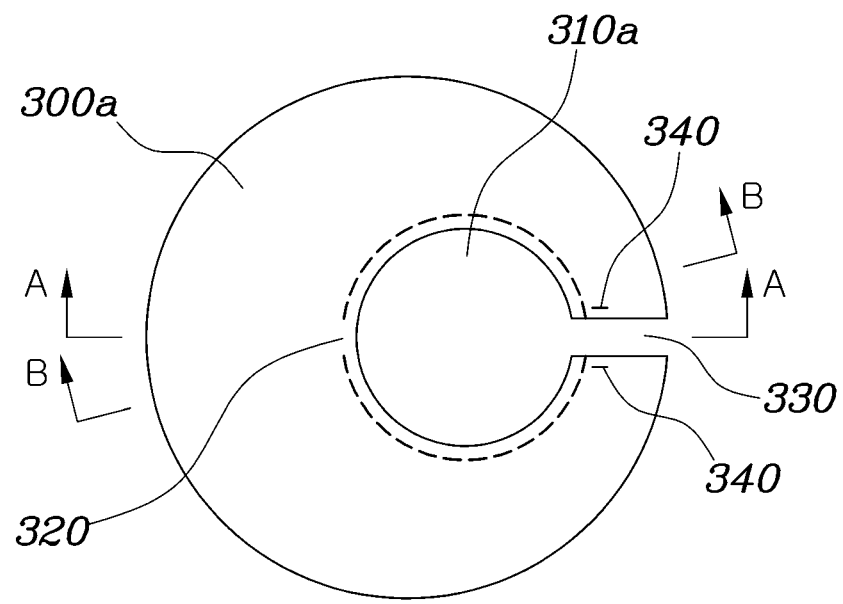
FIGS. 7A to 7F are views showing an assembly process of the airbag cushion according to the present invention.
Figure 7A:
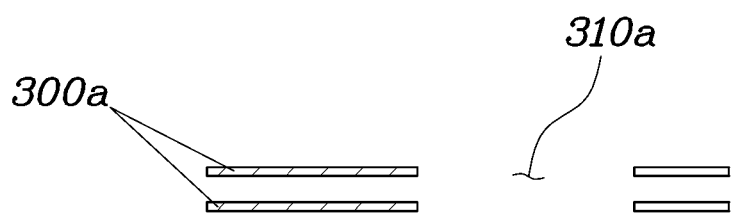
Figure 7A:
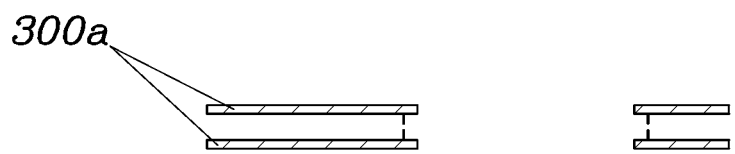
Figure 7B:
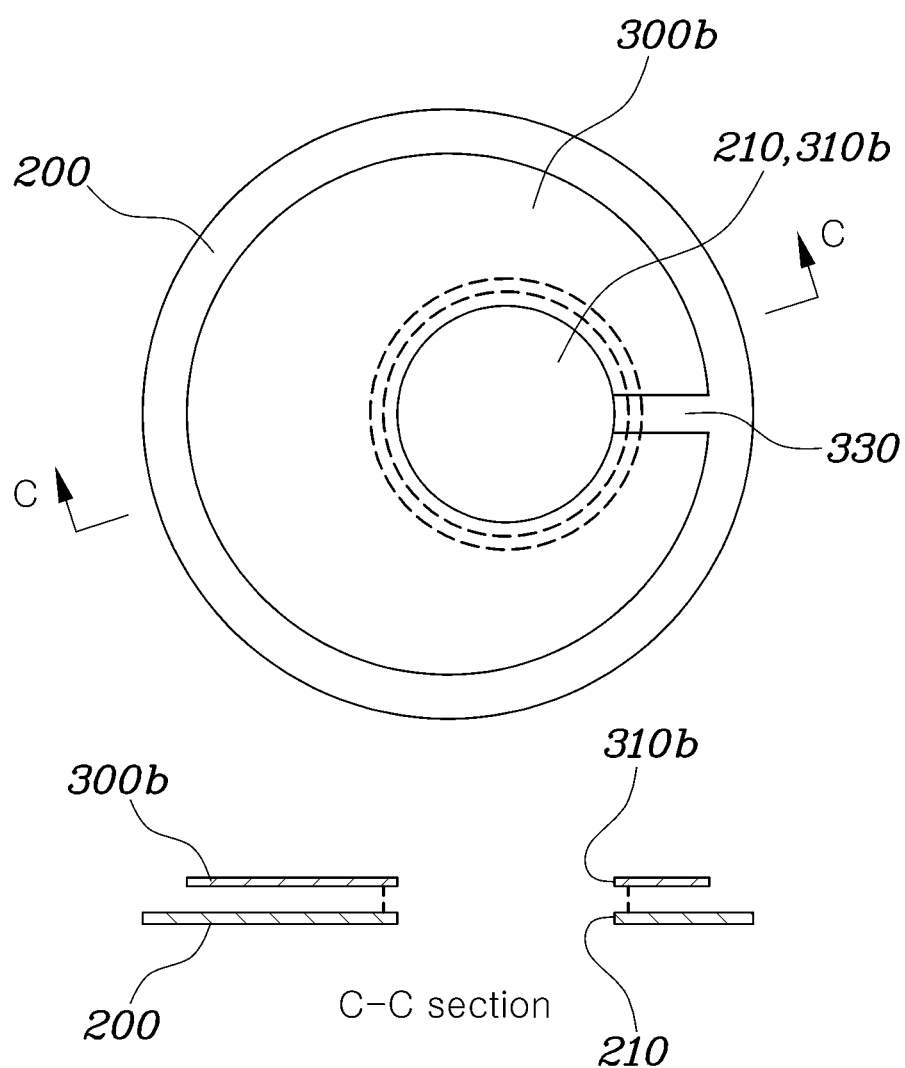
Figure 7C:
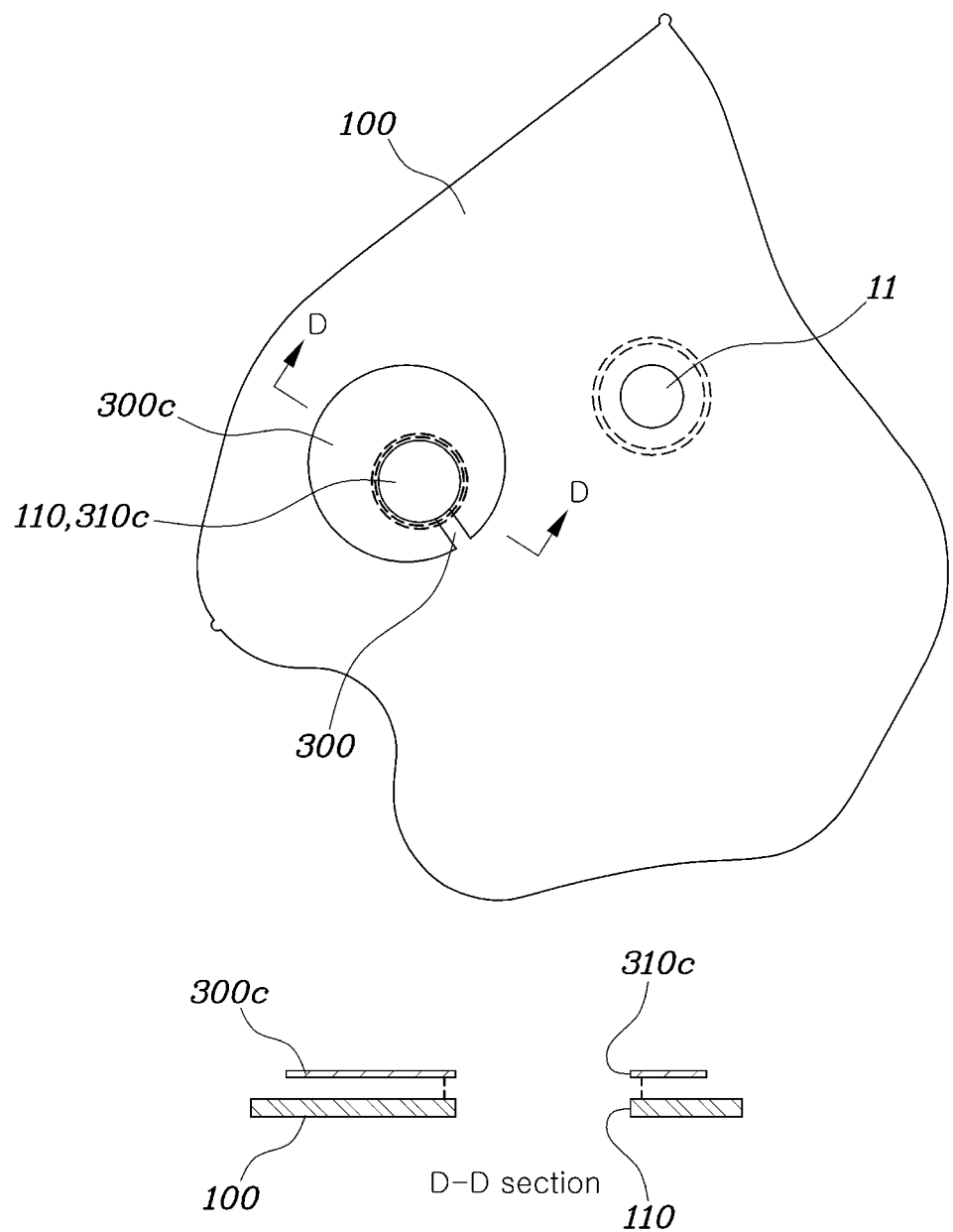
Figure 7D:
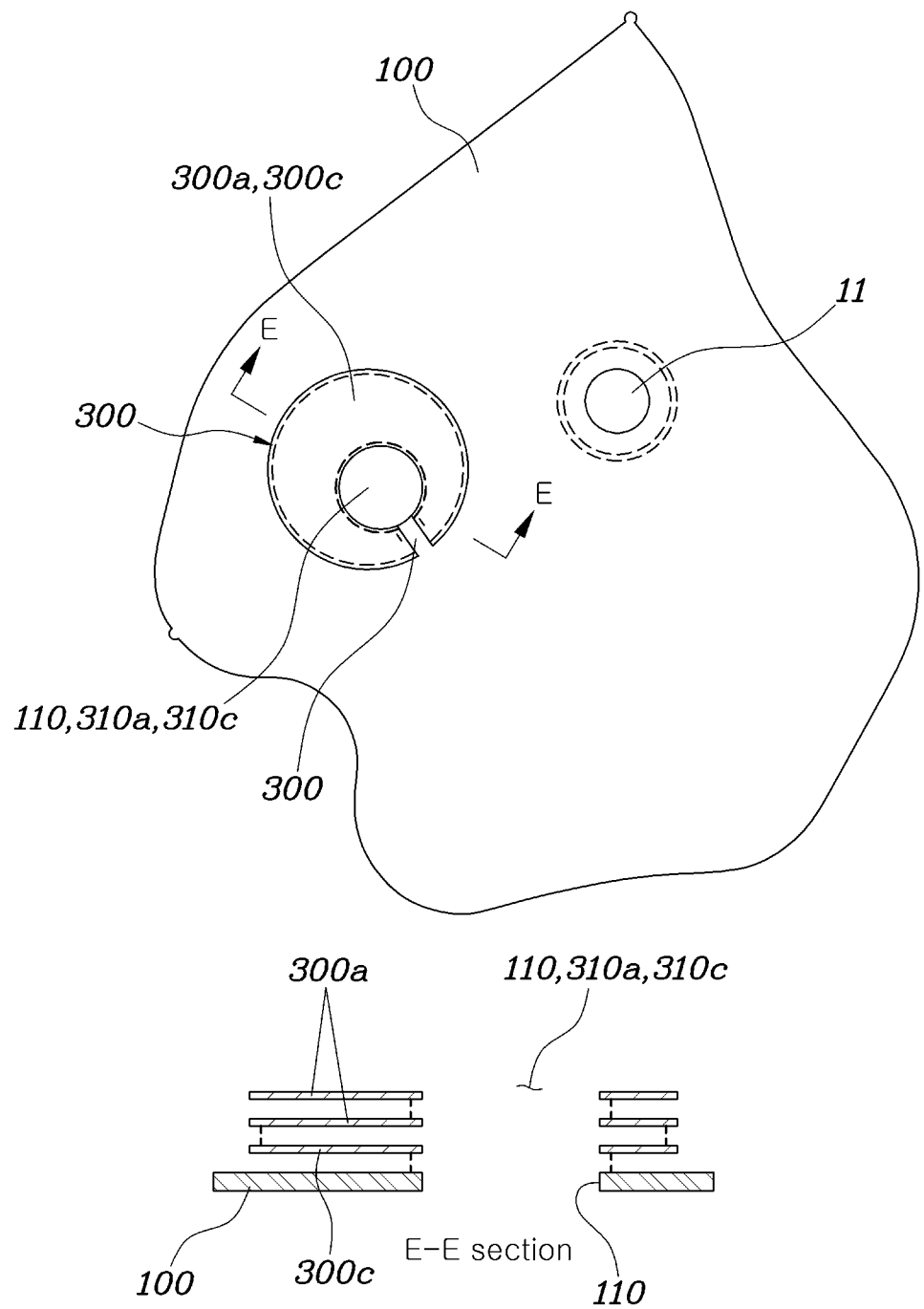
Figure 7E:
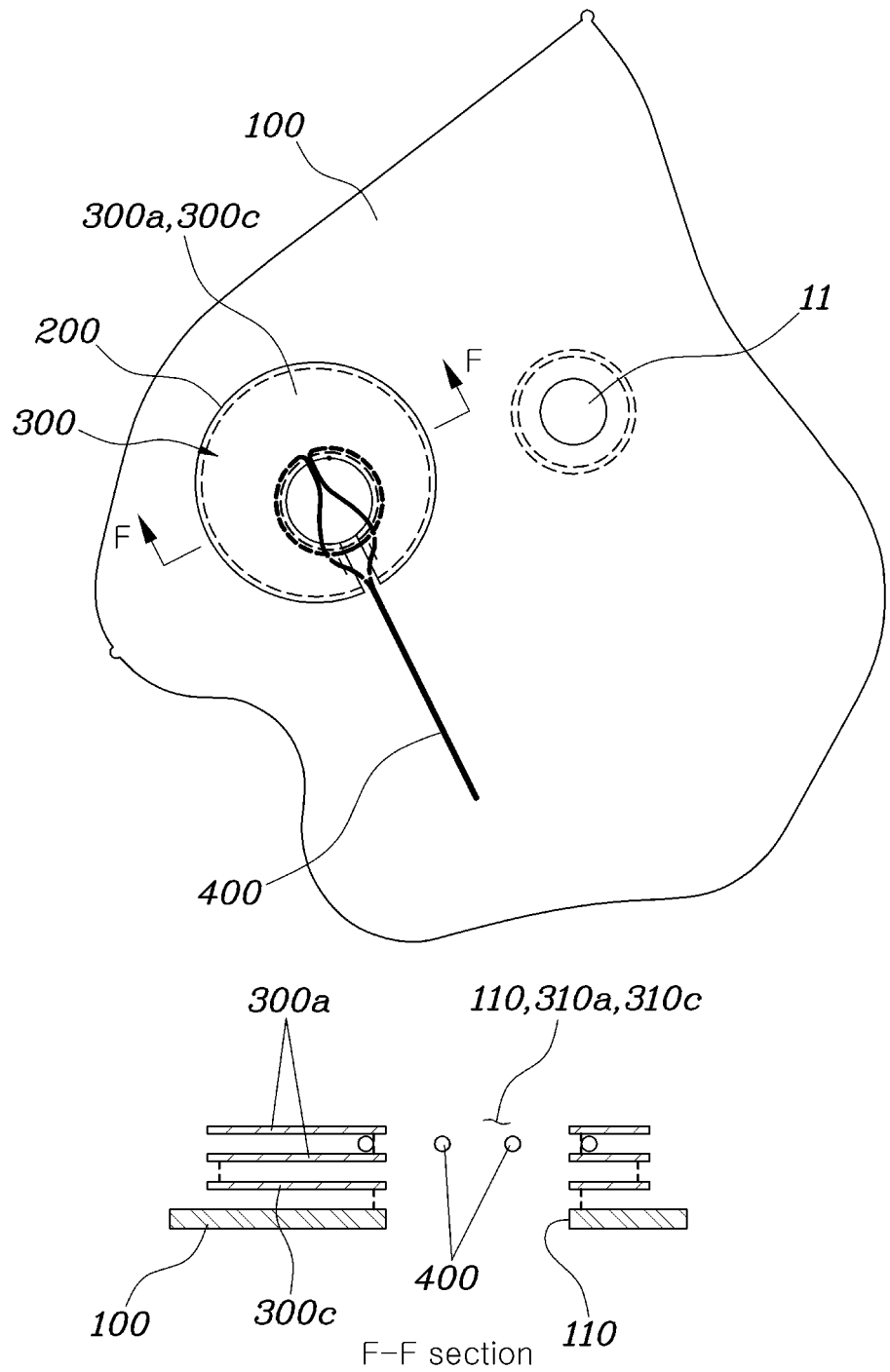
Figure 7F:
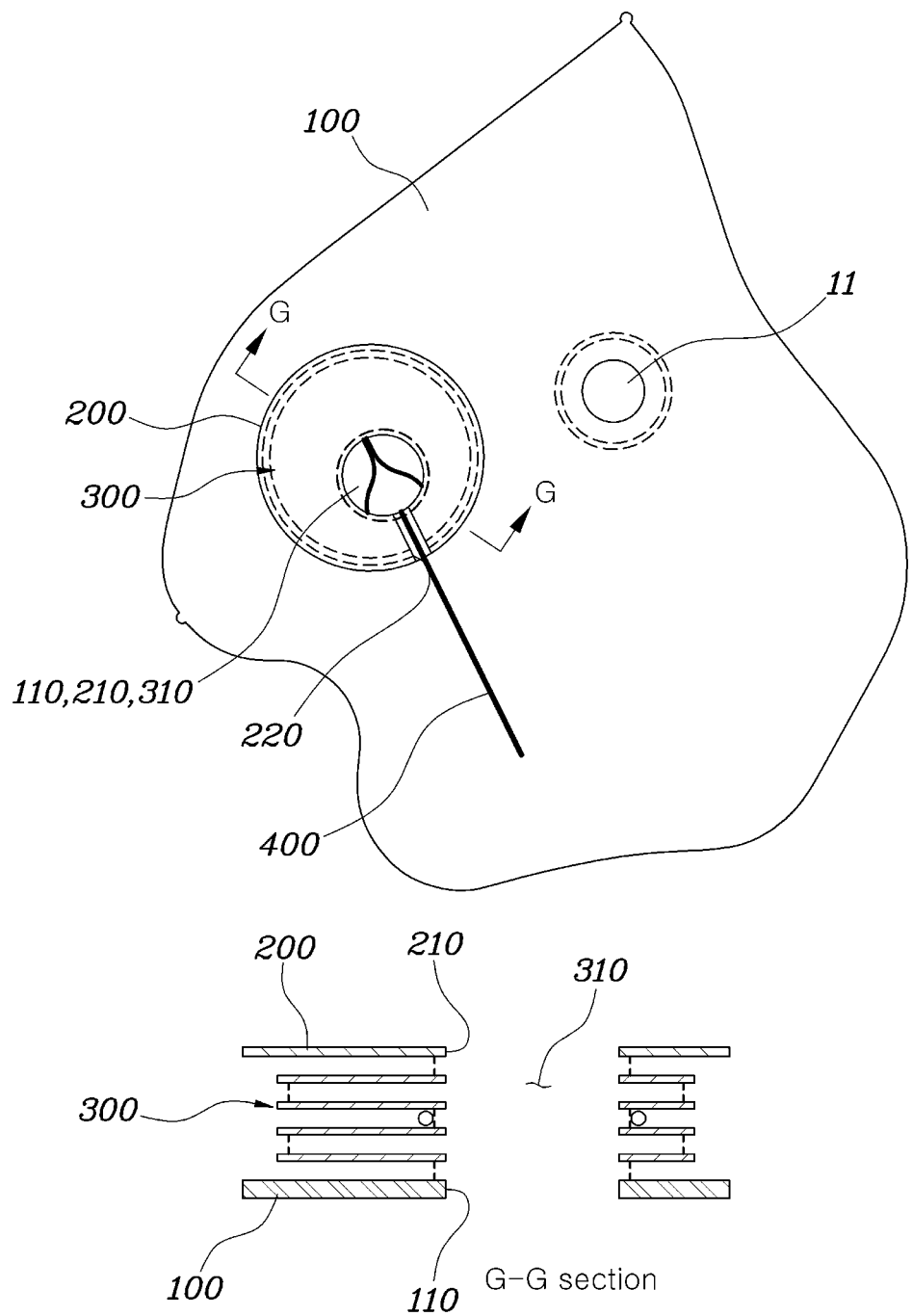

In addition, as shown in FIG. 7F, according to the present invention, an edge of the guide panel 200 is sewn with the cushion panel 100, and among the edge of the guide panel 200, a portion through which the tether 400 passes is prevented from being sewn.

In other words, the tether 400 connected to the bellows vent 300 is taken from the space between the guide panel 200 and the cushion panel 100 through the edge portion of the guide panel 200 sewn to the cushion panel 100.

Therefore, a slot 220 of a hole shape is formed by not sewing the edge portion of the guide panel 200, through which the tether 400 passes, so that the tether 400 passes through the slot 220, and thus movement of the tether 400 becomes smooth.

Figure 5:
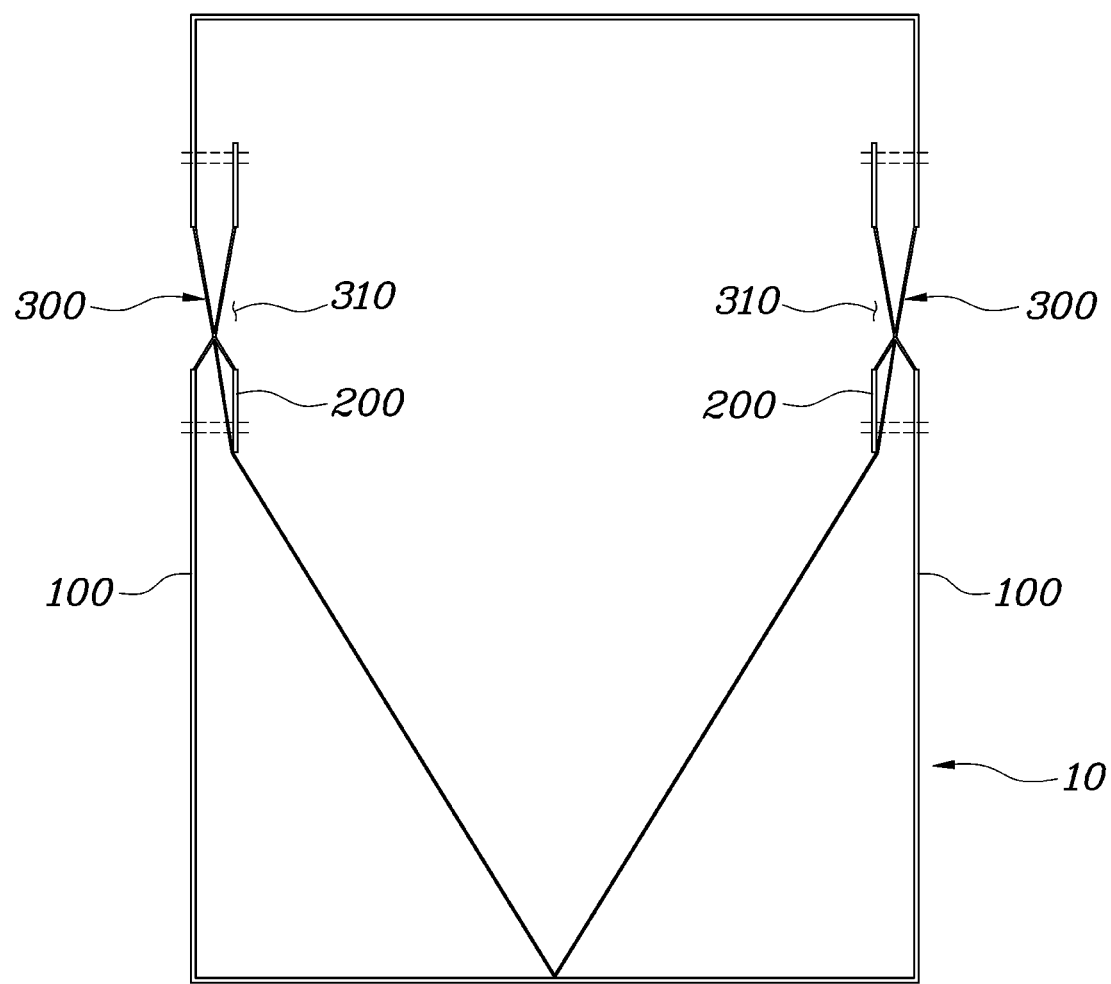
FIG. 5 is a view showing a state in which the bellows vent is closed in a deployment process of the airbag cushion according to the present invention.
Figure 6:
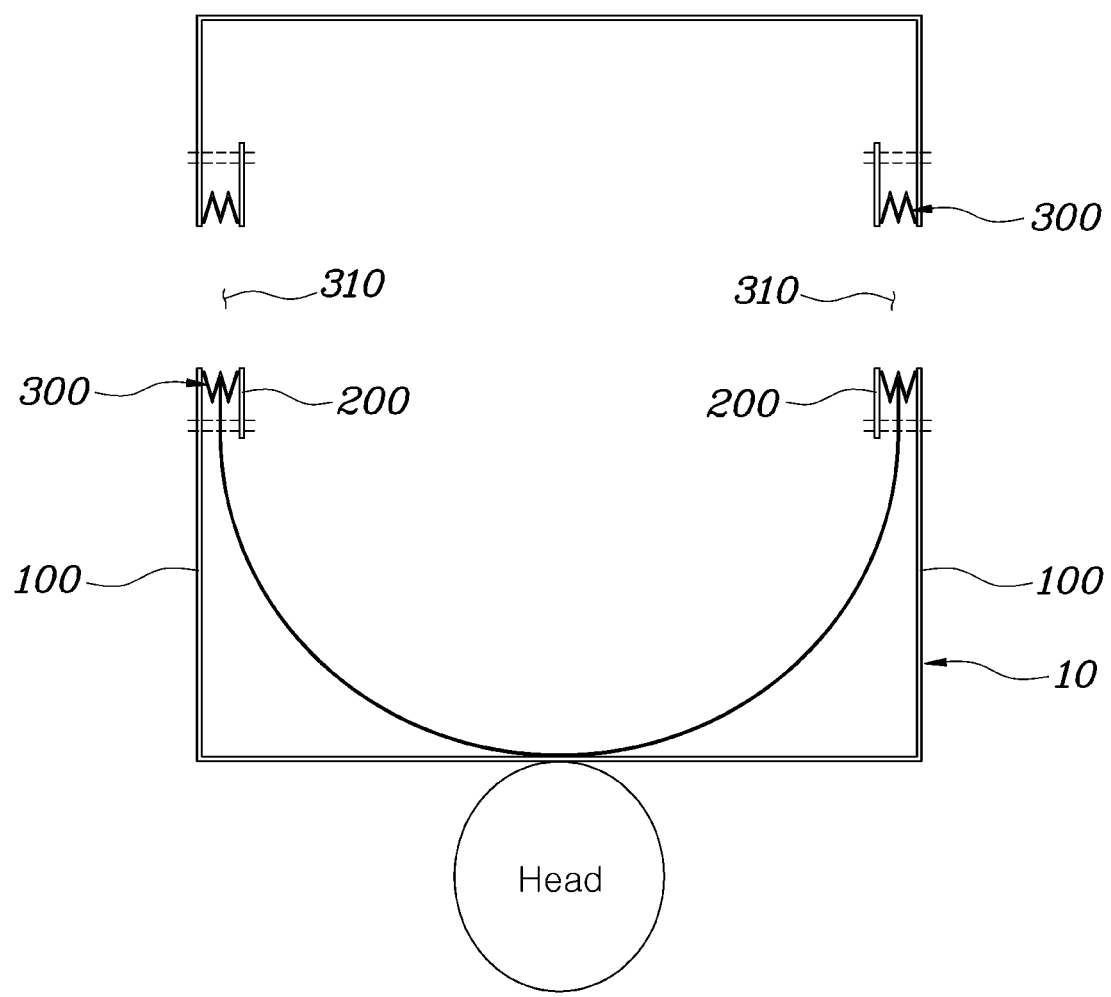
FIG. 6 is a view showing a state in which the bellows vent is opened in the deployment process of the airbag cushion according to the present invention.

In addition, as shown in FIGS. 5 and 6, in the present invention, the bellows vent 300 is tightened by the tension of the tether 400 so that the bellows vent 300 is pulled in a pulling direction of the tether 400.

To this end, an opening 330 may be formed open at a lateral surface of the bellows vent 300 in a direction of pulling the tether 400.

Figure 8:
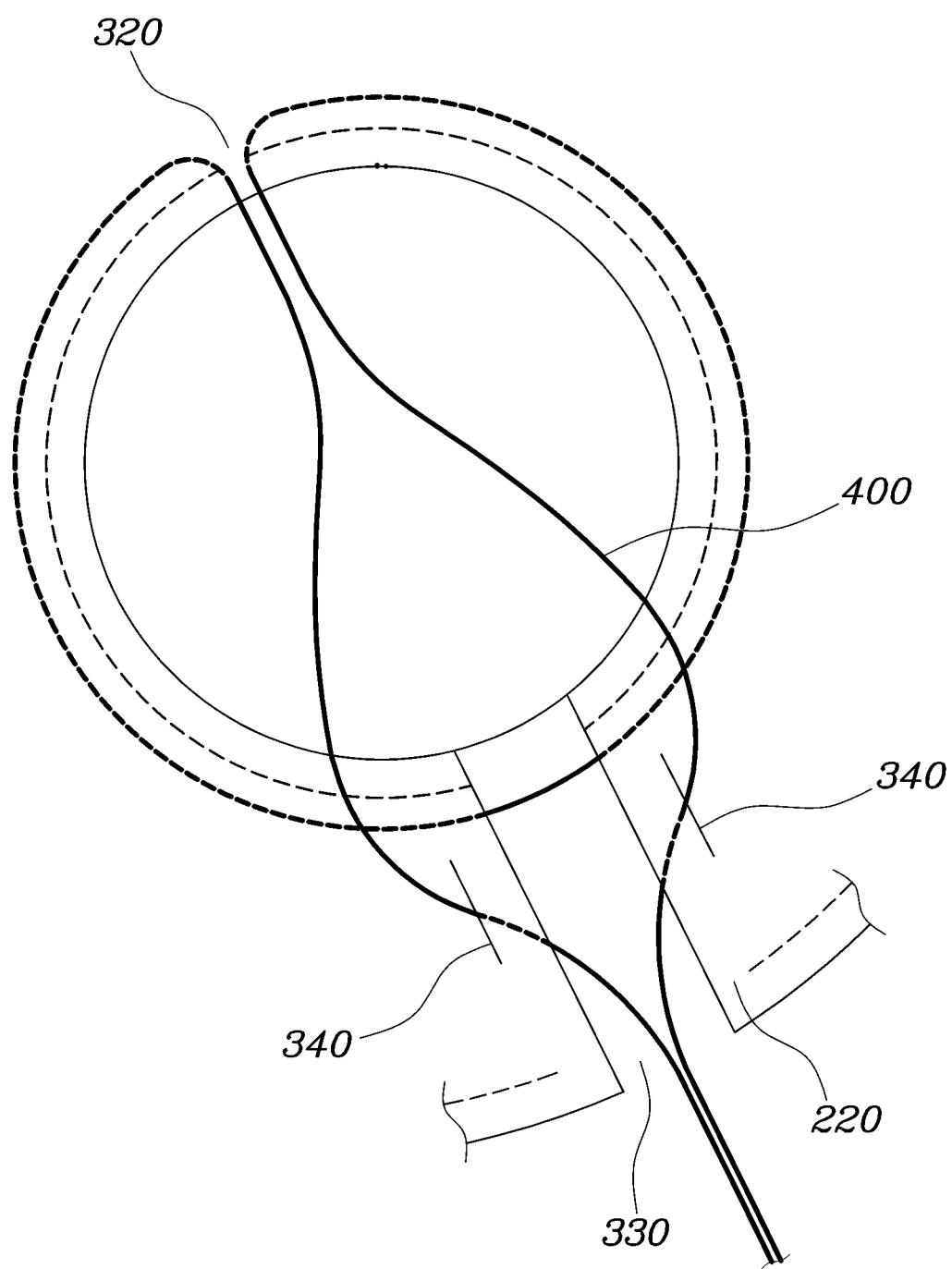
FIG. 8 is an enlarged view showing a tether shown in FIG. 7E.

In addition, as shown in FIGS. 7E and 8, slits 340 through which the tether 400 passes may be formed on the bellows vent 300 at opposite sides of the opening 330.

Accordingly, the tether 400 is connected thereto by wrapping around the bellows vent 300 and penetrating radially through the bellows vent 300, and the tether 400 that has penetrated through the bellows vent 300 may be connected thereto in a shape of passing through the slits 340 and being taken out through the opening 330.

For example, the tether 400 divided into two parts while wrapping around the bellows vent 300 penetrates through the slot 320 together, the slot 320 formed in the inner-diameter edges of the bellows panels 300a, and the tether 400 may cross radially the vent hole 310 of the bellows vent 300.

Then, the two parts of the tether 400 pass respectively through the opposite slits 340, and then are connected to each other in a shape of being taken out together through the opening 330.

Therefore, when the tether 400 is pulled by the expansion pressure of the airbag cushion 10, the portion of the tether 400, which penetrating through the bellows vent 300, is pulled and the tether 400 wrapping around the bellows vent 300 tightens the bellows vent 300, so that and the vent hole 310 is covered by the tightened bellows vent 300.

In addition, as shown in FIGS. 5 and 6, in the present invention, the tether 400 is provided in the direction of the airbag cushion 10 deployed from the bellows vent 300 and the tension of the tether 400 may be provided by the deployment force of the airbag cushion 10.

For example, in the passenger airbag cushion 10, as the airbag cushion 10 is deployed in a longitudinal direction of the vehicle, the tether 400 is also deployed in the deployment direction of the airbag cushion 10 and a tension is applied to the tether 400 by an expansion force of the airbag cushion 10.

Moreover, as described above, as the bellows vent 300 fixed to the tether 400 is pulled while being closer to the cushion panel 100 corresponding to an inner surface of the airbag cushion 10, the bellows vent 300 moves along the inner surface of the airbag cushion 10 to cover the vent hole 310 and the vent hole 310 is closed more securely, so that gas inside the airbag cushion 10 is prevented from being discharged through the vent hole 310.

In addition, the tether 400 may be fixed to a portion of the cushion panel 100, to which the passenger is cushioned.

In other words, in the font passenger airbag cushion 10, a part of the passenger's body including the head is cushioned at a passenger-side lower end of the airbag cushion 10.

Accordingly, as a middle portion of the tether 400 passes through the passenger-side lower end of the airbag cushion 10, when the passenger is cushioned by the airbag cushion 10, the middle portion of the tether 400 is pushed by the weight of the passenger, and the middle portion of the tether 400 is pressed toward the inside portion of the airbag cushion 10, thereby reducing the tension of the tether 400.

Therefore, the bellows vent 300 closing the vent hole 310 is recovered to the bellows tube shape and is prevented from closing the vent hole 310, so that the vent hole 310 may be opened.

Meanwhile, FIGS. 7A to 7F are views showing an assembly process of the airbag cushion 10 according to the present invention.

Referring to the drawings, a method for manufacturing the airbag cushion 10 of the present invention includes: assembling of the bellows vent, wherein the holes 310a formed in the plurality of bellows panels 300a are overlapped to match with each other, thereby assembling the bellows vent 300 having the hollow vent hole 310 therein; connecting of the bellows vent, wherein a first end of the vent hole 310 matches with the hole 110 of the cushion panel 100 to fix the bellows vent 300 to the cushion panel 100, and a second end of the vent hole 310 matches with the hole 210 of the guide panel 200 to fix the bellows vent 300 to the guide panel 200; fixing of the tether, wherein a first end of the tether 400 is fixed to the bellows vent 300, and a second end of the tether 400 is fixed to the portion of the cushion panel 100 to which the passenger is cushioned; and fixing of the guide panel 200, wherein the guide panel 200 is fixed to the cushion panel 100.

For example, as shown in FIG. 7A, with the holes 310a of two inner bellows panels 300a matching with each other, the inner-diameter edges of the bellows panels 300a are sewn.

In addition, although not shown in the drawing, as other inner bellows panels 300a are overlapped to opposite sides of the two inner bellows panels 300a overlapped with each other and then the outer-diameter edges of the inner bellows panels 300a are sewn, the inner-diameter edges and the outer-diameter edges of multiple layers of the inner bellows panels 300a are alternately sewn, thereby realizing the bellows vent 300 into the bellows tube shape.

In addition, as shown in FIG. 7B, with a hole 310b of an outer bellows panel 300b matching with the hole 210 of the guide panel 200, edges of the holes 210 and 310b matching with each other are sewn.

In addition, as shown in FIG. 7C, with a hole 310c of another outer bellows panel 300c matching with the hole 110 of the cushion panel 100, edges of the holes 110 and 310c matching with each other are sewn.

In addition, as shown in FIG. 7D, first portions of the inner bellows panels 300a assembled in the FIG. 7A are securely sewn with the other outer bellows panel 300c sewn with the cushion panel 100.

In addition, as shown in FIGS. 7E and 8, the tether 400 is wound around the bellows vent 300, and the tether 400 passes through the slot 320 formed in the inner bellows panels 300a, and then passes through the slits 340, and then is taken out toward the opening 330 and is fixed to the inner surface of the airbag cushion 10.

Next, as shown in FIG. 7F, the outer bellows panel 300b assembled in FIG. 7B is sewn with the second portion of the bellows panels 300a, and the guide panel 200 is sewn with the cushion panel 100, thereby assembling the airbag cushion 10.

Here, the tether 400 passing through the slits 340 passes through the slot 220 formed between the guide panel 200 and the cushion panel 100, thereby being fixed to the inner surface of the airbag cushion 10.

Hereinbelow, referring to the accompanying drawings, opening and closing operations of the vent hole 310 will be described.

When the passenger airbag is operated due to a vehicle collision, in the beginning of deployment of the airbag, gas is injected into the airbag cushion 10 and the airbag cushion 10 expands and is deployed rapidly.

At this time, since the time is before the expansion force of the airbag cushion 10 is applied to the tether 400, the tether 400 does not pull the bellows vent 300 and the vent hole 310 is maintained in the opened state. Accordingly, until the airbag cushion 10 is fully deployed, the gas is discharged through the vent hole 310 to reduce the internal pressure.

Next, in a process in which the airbag cushion 10 is fully deployed, as shown in FIG. 5, the tension is provided in the tether 400 by the expansion force of the airbag cushion 10.

Here, the first end of the tether 400 is connected to the bellows vent 300, and the middle portion of the tether 400 is fixed to the passenger-side inner surface of the airbag cushion 10, so that the tether 400 pulls the bellows vent 300 by the tension provided in the tether 400.

Therefore, as the bellows vent 300 is unfolded toward the vent hole 310 in the space between the cushion panel 100 and the guide panel 200, the vent hole 310 is closed by the bellows vent 300 and the gas is prevented from being discharged through the vent hole 310.

Accordingly, until a time the passenger is cushioned by the airbag cushion 10, the internal pressure of the airbag cushion 10 may be maintained.

Next, after the airbag cushion 10 is fully deployed, when the head of the passenger is cushioned by the airbag cushion 10 as shown FIG. 6, the middle portion of the tether 400 is pushed toward the inner portion of the airbag cushion 10, and the middle portion of the tether 400 is pressed toward the inner portion of the airbag cushion 10.

Therefore, as the tension of the tether 400 is reduced, the bellows vent 300 unfolded toward the vent hole 310 is recovered to the bellows tube shape again, so that the vent hole 310 is opened.

Accordingly, the passenger is safely restrained and a risk of injuries to the passenger is reduced.

As described above, according to the present invention, at the beginning of deployment of the airbag, the bellows vent 300 is unfolded by the tension of the tether 400, thereby maintaining the vent hole 310 in the closed state, and then in the process in which the passenger is cushioned by the airbag cushion 10 and is restrained, the bellows vent 300 is recovered and the vent hole 310 is opened, so that the vent hole 310 is opened and closed without a device such as an active vent or a device additionally applying an operation signal. Accordingly, the opening and closing operability of the vent hole 310 is increased and injuries to the passenger can be efficiently reduced.

Although the preferred embodiments of the present invention have been disclosed in detail only with respect to the above specific embodiments, those skilled in the art will appreciate that various modifications, additions, and substitutions are possible, without departing from the spirit and scope of the present invention, and it is appropriate that the various modifications, additions, and substitutions belong to the accompanying claims.

What is claimed is:

1. An airbag device comprising:
   a cushion panel of an airbag cushion, the cushion panel having a hole;
   a guide panel overlapped with the cushion panel and having a hole matching the hole of the cushion panel;
   a bellows vent having a hollow vent hole and being connected to the hole of the cushion panel and the hole of the guide panel in a folded state while being located therebetween; and
   a tether connected to the bellows vent and being configured to close the vent hole by the bellows vent unfolded between the cushion panel and the guide panel as a tension pulling the bellows vent in a deployment direction of the airbag cushion, due to an expansion pressure of the airbag cushion, is generated.

2. The airbag device of claim 1, wherein the bellows vent is configured to be folded with its vent hole matching the hole of the cushion panel and the hole of the guide panel.

3. The airbag device of claim 1, wherein the bellows vent comprises a plurality of bellows panels, holes being respectively formed in the bellows panels, the holes matching and overlapping with each other, and the bellows panels are sewn such that inner-diameter edges and outer-diameter edges of the bellows panels are alternately sewn in an order in which the bellows panels are overlapped.

4. The airbag device of claim 3, wherein among the sewn edges of the bellows panels, a portion through which the tether passes is in a non-sewn state.

5. The airbag device of claim 1, wherein the guide panel is overlapped with an inner portion of the cushion panel and fixed; and
   the tether is connected to the bellows vent between the cushion panel and the guide panel.

6. The airbag device of claim 5, wherein an edge of the guide panel is sewn with the cushion panel, and among the edge of the guide panel, a portion through which the tether passes is in a non-sewn state.

7. The airbag device of claim 1, wherein the bellows vent is pulled in a pulling direction of the tether as the bellows vent is tightened by the tension of the tether.

8. The airbag device of claim 1, wherein an opening is formed open on a lateral surface of the bellows vent in a pulling direction of the tether.

9. The airbag device of claim 8, wherein slits through which the tether passes are formed in the bellows vent at opposite sides of the opening.

10. The airbag device of claim 9, wherein the tether passes radially through the hole of the bellows vent while wrapping around the bellows vent, and the tether is connected thereto in a shape in which the tether that has penetrated through the bellows vent passes through the slits and is taken out through the opening.

11. The airbag device of claim 1, wherein the tether is provided in a deployment direction of the airbag cushion from the bellows vent and the tension is provided by a deployment force of the airbag cushion.

12. The airbag device of claim 1, wherein the tether is fixed to a portion of the cushion panel for a passenger.

13. The airbag device of claim 1, wherein the vent hole is an low risk deployment (LRD) vent hole configured to realize an LRD function.

14. A passenger seat airbag device comprising:
a cushion panel of a passenger airbag cushion, the cushion panel having a hole;
a guide panel overlapped with the cushion panel, and having a hole matching the hole of the cushion panel;
a bellows vent having a hollow vent hole and being connected to the hole of the cushion panel and the hole of the guide panel in a folded state while being located therebetween; and
a tether connected to the bellows vent and being configured to close the vent hole by the bellows vent unfolded between the cushion panel and the guide panel as a tension pulling the bellows vent in a deployment direction of the airbag cushion, due to an expansion pressure of the airbag cushion, is generated.

15. A method of manufacturing an airbag cushion, the method comprising:
assembling a bellows vent, wherein holes formed in a plurality of bellows panels are overlapped to match with each other such that the bellows vent comprises a hollow vent hole;
connecting the bellows vent, wherein a first end of the vent hole matches with a hole of a cushion panel to fix the bellows vent to the cushion panel, and a second end of the vent hole matches with a hole of a guide panel to fix the bellows vent to the guide panel;
connecting a tether, wherein a first end of the tether is connected to the bellows vent and a second end of the tether is fixed to a portion of the cushion panel for a passenger; and
fixing the guide panel to the cushion panel.

16. The method of claim 15, wherein in assembling the bellows vent, the bellows vent is sewn such that inner-diameter edges and outer-diameter edges of the bellows panels are alternately sewn in an order in which the bellows panels are overlapped.

17. The method of claim 15, wherein the guide panel is overlapped with an inner portion of the cushion panel; and
the tether is connected to the bellows vent between the cushion panel and the guide panel.

18. The method of claim 15, wherein in fixing of the guide panel, an edge of the guide panel is sewn with the cushion panel, and in the edge of the guide panel, a portion through which the tether passes is in a non-sewn state.

19. The method of claim 15, wherein an opening is formed on a lateral surface of the bellows vent in a pulling direction of the tether, and slits through which the tether passes are formed in the bellows vent at opposite sides of the opening; and
in fixing of the tether, the tether passes radially through the bellows vent while wrapping around the bellows vent, and the tether is connected thereto in a shape in which the tether that has penetrated through the bellows vent passes through the slits and is taken out through the opening.

* * * * *